(12) United States Patent
Kim et al.

(10) Patent No.: US 8,716,398 B2
(45) Date of Patent: May 6, 2014

(54) METHOD FOR PREPARING BIODEGRADABLE POLYMER STEREOCOMPLEXES USING A SUPERCRITICAL FLUID-ORGANIC SOLVENT SYSTEM AND STEREOCOMPLEXES PREPARED BY THE SAME

(75) Inventors: Soo Hyun Kim, Seoul (KR); Young Mee Jung, Seoul (KR); Sang-Heon Kim, Seoul (KR); Purnama Purba, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 54 days.

(21) Appl. No.: 12/948,621

(22) Filed: Nov. 17, 2010

(65) Prior Publication Data

US 2011/0201710 A1 Aug. 18, 2011

(30) Foreign Application Priority Data

Feb. 12, 2010 (KR) ........................ 10-2010-0013353

(51) Int. Cl.
| | |
|---|---|
| C08F 290/14 | (2006.01) |
| C08F 283/04 | (2006.01) |
| C08G 63/91 | (2006.01) |
| C08G 65/32 | (2006.01) |
| C08L 67/00 | (2006.01) |
| C08L 71/00 | (2006.01) |
| C08J 9/00 | (2006.01) |
| C08J 9/12 | (2006.01) |

(52) U.S. Cl.
USPC ............... 525/50; 521/78; 521/82; 521/134; 525/410

(58) Field of Classification Search
USPC .................. 521/78, 82, 134; 525/50, 410
See application file for complete search history.

(56) References Cited

U.S. PATENT DOCUMENTS

| | | | |
|---|---|---|---|
| 4,981,696 A | 1/1991 | Loomis et al. | |
| 5,317,064 A | 5/1994 | Spinu | |
| 6,365,173 B1 * | 4/2002 | Domb et al. ................ | 424/426 |
| 6,913,826 B2 * | 7/2005 | Lee et al. ..................... | 428/402 |
| 2008/0207840 A1 | 8/2008 | Södergard et al. | |
| 2010/0260703 A1 * | 10/2010 | Yankelson et al. ......... | 424/78.38 |

FOREIGN PATENT DOCUMENTS

| | | |
|---|---|---|
| KR | 10-0503890 B1 | 7/2005 |
| KR | 10-0819729 B1 | 4/2008 |
| WO | WO 2008/057214 A2 | 5/2008 |
| WO | WO 2009/045877 A1 | 4/2009 |
| WO | WO 2009/045881 A1 | 4/2009 |

OTHER PUBLICATIONS

Lee et al. "Phase Behavior of Poly(L-lactide) in Supercritical Mixtures of Dichloromethane and Carbon Dioxide." 2002, J Chem. Eng. Data. 47, 367-370.*
Fukushima et al., A Novel Synthetic Approach to Stereo-Block Poly(lactic acid), Macromol. Symp. vol. 224, pp. 133-143 (2005).
Ikada et al., Stereocomplex Formation between Enantiomeric Poly(lactides), Macromolecules, vol. 20, pp. 904-906 (1987).
Lee et al., Phase Behavior of Poly(L-lactide) in Supercritical Mixtures of Carbon Dioxide and Chlorodifluoromethane, J. Chem. Eng. Data, vol. 45, pp. 1162-1166 (2000).
Purnama et al., Stereocomplex Formation of High-Molecular-Weight Polylactide Using Supercritical Fluid, Macromolecules, vol. 43, pp. 1137-1142 (2010) (Published on Web Dec. 31, 2009).
Tsuji et al., Stereocomplex Formation between Enantiomeric Poly(lactic acid)s. 7. Phase Structure of the Stereocomplex Crystallized from a Dilute Acetonitrile Solution As Studied by High-Resolution Solid-State $^{13}C$ NMR Spectroscopy, Macromolecules, vol. 25, pp. 4114-4118 (1992).
Tsuji, Hideto, Poly(lactide) Stereocomplexes: Formation, Structure, Properties, Degradation, and Applications, Macromol. Biosci. vol. 5, pp. 569-597 (2005).

* cited by examiner

*Primary Examiner* — Melissa Rioja
(74) *Attorney, Agent, or Firm* — Ladas & Parry LLP

(57) ABSTRACT

The present invention relates to methods for preparing biodegradable polymer stereocomplexes using a supercritical fluid-organic solvent system and polymer stereocomplexes prepared by such methods. The method of the present invention involves introducing two types of homopolymers having different stereostructures and a small amount of organic solvent into a reactor, adding a supercritical fluid thereto, followed by applying a specific temperature and pressure to form a polymer stereocomplex having a crystalline structure. According to the method of the present invention, biodegradable polymer stereocomplexes in the form of powder or porous foam having excellent thermal and mechanical stabilities can be prepared in a simple, economical and environmentally-friendly manner in a single process.

19 Claims, 4 Drawing Sheets

METHOD FOR PREPARING BIODEGRADABLE POLYMER STEREOCOMPLEXES USING A SUPERCRITICAL FLUID-ORGANIC SOLVENT SYSTEM AND STEREOCOMPLEXES PREPARED BY THE SAME

This work was supported by the National Research Foundation of Korea Grant funded by the Korean Government (MEST) under NRF-2010-C1AAA001-2010-0028939.

CROSS-REFERENCE TO RELATED APPLICATIONS

The present application claims priority to Korean Patent Application No. 10-2010-13353, filed Feb. 12, 2010, the subject matter of which is incorporated herein by reference in its entirety.

FIELD OF THE INVENTION

The present invention relates to simple, economical and environmentally-friendly methods for preparing biodegradable polymer stereocomplexes having a uniform form, such as powder or porous foam, and excellent thermal and mechanical stabilities by using a supercritical fluid-organic solvent system.

BACKGROUND OF THE INVENTION

Recently, there are mounting concerns for environmental pollution caused by non-degradable petroleum-based plastics and for the depletion of petroleum resources, where there is an interest in applications of renewable natural resources, such as starch, pectin and protein, to food packages that require biodegradability and water solubility. Due to their inherent degradable properties, biodegradable polymer materials have been in the spotlight in various fields, such as medicine, agriculture, environmental, and have been especially valuable in the environmental and medical fields. These polymers can be roughly divided into two groups: natural and synthetic biodegradable polymers. Among these, natural biodegradable polymers are recognized as promising materials, since their raw materials are natural products and are thus environmentally-friendly while having excellent physical performance or adaptability to living organisms, but are problematic in that they are expensive and difficult to arbitrarily control in view of the characteristics of natural products. On the other hand, because of their ability to artificially control and make up for what natural biodegradable polymers lack, synthetic biodegradable polymers have recently been highly rated for their commercial value.

Among the synthetic biodegradable polymer materials, particularly polylactides (PLA) have been used for various applications in the environmental and medical fields due to their excellent performance, environmental friendliness, biocompatibility and non-toxicity. In particular, they have been attracting attention for use in the environmental field, such as disposable packaging films, agricultural and industrial films, and food packaging containers, and have already been used in the medical field, such as drug delivery systems (DDS) for drug release control, pins for securing bone and tissue, screws and sutures. Further, research utilizing such biodegradable polymers in automobile part materials, industrial materials, etc. by enhancing their thermal and mechanical stabilities is also in progress.

In the meantime, the trend in developing these new materials is not only aimed at achieving high functionality of products but research is being carried out towards developing environmentally-friendly products. Thus, there has been an increasing demand by the industry for new materials that can meet the above various conditions. For example, polymer stereocomplexes that are obtained when two enantiomeric types of homopolymers are melted or uniformly mixed with the addition of organic solvents at a temperature above a specific temperature form new crystalline structures and have excellent properties such as higher thermal and mechanical stabilities, as compared to homopolymers, and thus, can be considered a new material that satisfies the demands of the high-tech industry Okada et al., *Macromolecules*, 20, 904 (1987)). In particular, products utilizing stereocomplexes have improved physical properties and performances and can be used for prolonged periods of time, thereby making it possible to reduce the amount of waste and prevent environmental pollution. Such polymer stereocomplexes may be applicable to various fields, including not only the automobile, packaging and semiconductor industries but also food, medicine, communication and military, depending on the type and molecular weight of the polymers.

In preparing such stereocomplexes, organic solvents may typically be used, or in case where no organic solvent is used, methods using direct melt blending or bulk polymerization may be used. Among these, solvent casting is the most commonly used method, but is problematic in that it is difficult to find suitable organic solvents capable of dissolving biopolymers for preparing the biodegradable polymer stereocomplexes and it takes a long time to thoroughly remove the residual organic solvent after the stereocomplexes are produced (Tsuji et al., *Macromol. Biosci.*, 5, 569 (2005)). In the case of melt blending, its use is limited since it requires a high temperature process of 200° C. or higher which may promote the degradation of biodegradable polymers, in which case there is a high likelihood that the crystallization of homopolymers will be induced rather than the formation of stereocomplexes (Tsuji et al., *Macromolecules*, 25, 4114 (1992)).

Further, it has been reported that there are limitations in the preparation of high molecular weight biodegradable polymer stereocomplexes having high strength, since the weight average molecular weights of the biodegradable polymers that can be prepared by the above methods range in the hundreds of thousands on average (Fukushima et al., *Macromol. Symp.*, 224, 133 (2005)). Thus, it can be found that there are limitations in preparing high strength biodegradable polymer stereocomplexes having thermal and mechanical stabilities using the above methods. Accordingly, a great deal of research is being carried out regarding novel methods for preparing high weight average molecular weight biodegradable polymer stereocomplexes having high strength.

Meanwhile, carbon dioxide is a widely used supercritical fluid, owing to its low critical temperature and pressure, low cost, incombustibility and non-toxicity. However, supercritical carbon dioxide (sc-$CO_2$) is problematic in that it cannot dissolve polymers other than fluoro-based polymers and silicone-based polymers (siloxane polymers). Accordingly, the present inventors have endeavored to overcome the problems associated with the conventional methods of preparing biodegradable polymer stereocomplexes utilizing the melting process or organic solvents only, and arrived at the present invention by developing methods for preparing biodegradable polymer stereocomplexes having a uniform form, such as powder or porous foam, and enhanced thermal and mechanical stabilities, where different types of enantiomers are mixed within a short time by using a mixed system of supercritical fluid-organic solvent while applying a specific temperature and pressure to form a new crystalline structure.

SUMMARY OF THE INVENTION

The present invention relates to a simple, economical and environmentally-friendly method for preparing biodegradable polymer stereocomplexes having a uniform form, such as powder or porous foam, and excellent thermal and mechanical stabilities by using a supercritical fluid-organic solvent system. The method first involves introducing two types of biodegradable homopolymers having different stereostructures into a reactor. Next, a small amount of organic solvent and a supercritical fluid are added thereto, followed by applying a specific temperature and pressure to uniformly mix the homopolymers, thereby inducing the crystallization reaction.

Another aspect of the present invention relates to polymer stereocomplexes having a uniform form, such as powder or porous sponge, which are prepared by the above methods.

DETAILED DESCRIPTION OF THE INVENTION

Figure 1:
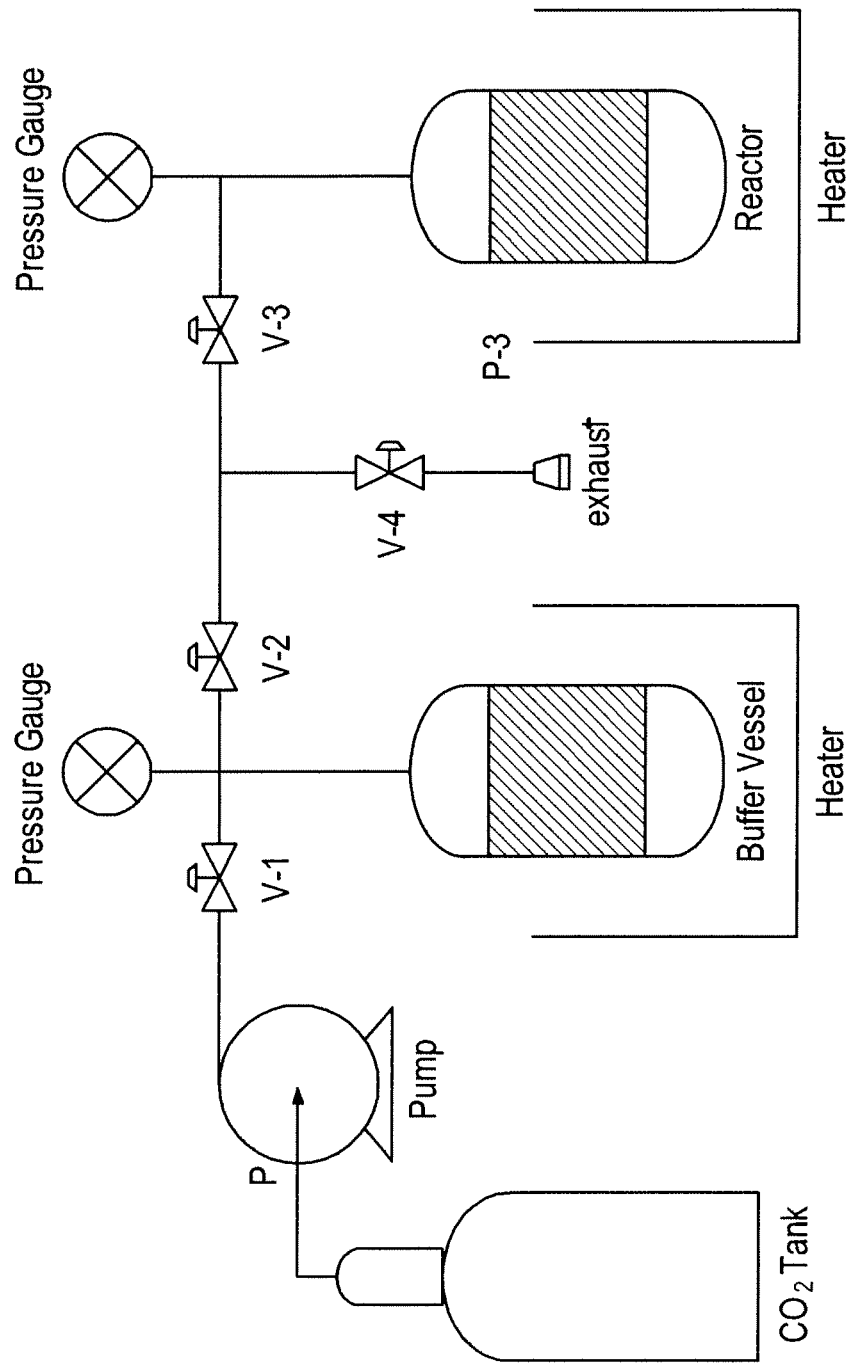
FIG. 1 is a schematic diagram showing the supercritical fluid-organic solvent system for forming the polymer stereocomplexes in accordance with the present invention.

The methods for preparing biodegradable polymer stereocomplexes of the present invention produce biodegradable polymer stereocomplexes by melting and uniformly mixing two types of biodegradable homopolymers having different stereostructures, using a supercritical fluid that is a compressed gas and a small amount of organic solvent as reaction solvents, followed by applying a specific temperature and pressure to cause crystallization.

As disclosed in U.S. Patent Application Publication No. 2008/0207840A1, U.S. Pat. Nos. 4,981,696 and 5,317,064, PCT International Patent Publication Nos. WO 09/045,881, WO 09/045,877, WO 08/057,214, monomers of polymers can be the isomers of L-form (R-) or D-form (S-), if they contain a chiral carbon atom. The chirality is retained even after the monomers are formed into polymers, and the mixtures where the polymers formed from the D-form and L-form monomers, respectively, are uniformly mixed form stereocomplexes having a new crystalline structure. Polymer stereocomplexes are defined herein as such. Such polymer stereocomplexes generally have higher crystalline melting point, as compared to homopolymers, and thus have increased heat resistance.

Further, a supercritical fluid is defined herein as a substance above its critical temperature ($T_c$) and critical pressure ($P_c$). All pure gases have a critical temperature ($T_c$) above which the gas cannot liquefy regardless of what pressure is applied, and a critical pressure ($P_c$) required for liquefying the gas at its critical temperature. As such, a supercritical fluid above the critical temperature and critical pressure has a solubility similar to that of a liquid, while a viscosity similar to that of a gas, and thus, can replace an incompressible organic solvent.

In a polymer reaction, one of the important advantages of using a supercritical fluid in a continuous phase is that solvent properties, such as the dielectric constant, can be controlled by simply changing the temperature or pressure of a system, whereby the solubility of the polymer can be controlled. Carbon dioxide is frequently used as a supercritical fluid due to its low critical temperature and pressure, low cost, incombustibility and non-toxicity, but is problematic in that it cannot dissolve polymers other than fluoro- or silicone-based polymers. In particular, it is known that biodegradable polyester-based polymers, such as polylactides, are nearly insoluble in supercritical carbon dioxide. Rather, supercritical carbon dioxide is used as an antisolvent when preparing polymer particles by supercritical fluid precipitation. It has been known that polylactide is not completely soluble in pure supercritical carbon dioxide, even at a high pressure of 80 MPa or above and a high temperature of 373.15K or above (Lee et al., *J. Chem. Eng. Data,* 45, 1162 (2000)).

On the other hand, organic solvents such as chloroform, dichloromethane and dioxane can easily dissolve biodegradable polyester-based polymers, even at room temperature. Thus, the solubility of a polymer can be increased by adding a small amount of organic solvent to supercritical carbon dioxide, which is due to the fact that a polar moment of the organic solvent interacts with that of the ester group of the biodegradable polyester-based polymer.

The methods for preparing biodegradable polyester-based polymer stereocomplexes having a uniform form, such as powder or porous foam, using a supercritical fluid-organic solvent system according to the present invention are described in more detail below.

First, two types of polyester-based homopolymers (D-form and L-form) are formed into a polymer stereocomplex by introducing the polyester-based homopolymers into a reactor, adding an organic solvent and then a supercritical fluid that is a compressed gas as a reaction solvent, and stirring under a temperature ranging from 25 to 250° C., more specifically from 25 to 150° C., and a pressure ranging from 40 to 700 bar, more specifically from 100 to 400 bar.

When the reaction pressure is less than 40 bar, the amount of homopolymer that can be introduced into the reactor decreases, leading to the problem of decreased amounts of the obtained polymer stereocomplex. On the other hand, a reactor pressure of greater than 700 bar is undesirable, since the equipment and operating costs rise sharply due to the super high pressure.

A reaction temperature less than 25° C. does not exceed the critical point of carbon dioxide, leading to the prevention of formation of the supercritical carbon dioxide, whereas a temperature of 150° C. or higher causes thermal degradation of the polymer, resulting in a lower productivity of the stereocomplex, even when compared to that at a low temperature. Thus, the desirable reaction temperature may range from 25 to 150° C.

The reaction time may be specifically from 5 minutes to 10 hours, more specifically from 10 minutes to 5 hours, since the stereocomplex yield reaches about 100% within 10 hours and a longer reaction time may cause thermal degradation.

Examples of supercritical fluids which can be used for the present invention include compressed gases such as carbon dioxide ($CO_2$), dichlorotrifluoroethane (HFC-23), difluoromethane (HFC-32), difluoroethane (HFC-152a), trifluoroethane (HFC-143a), tetrafluoroethane (HFC-134a), pentafluoroethane (HFC-125), heptafluoropropane (HFC- 227ea), hexafluoropropane (HFC-236fa), pentafluoropropane (HFC-245fa), sulfur hexafluoride ($SF_6$), perfluorocyclobutane (C-318), chlrorofluoroethane (HCFC-1416), chlorodifluoroethane (HCFC-1426), dimethyl ether, nitrogen dioxide ($NO_2$), propane, butane and mixtures thereof.

In the present invention, the introduction of supercritical fluid is carried out by passing a gas, such as carbon dioxide, through a chiller to completely liquefy the gas, then pressurizing the gas using a high pressure liquid pump, allowing the compressed gas, such as liquid carbon dioxide, to enter the reactor.

Examples of organic solvents which can be used in the supercritical fluid-organic solvent system include chloroform, dichloromethane, dioxane, toluene, xylene, ethylbenzene, dichloroethylene, dichloroethane, trichloroethylene, chlorobenzene, dichlorobenzene, tetrahydrofurane, dibenzylether, dimethyl ether, acetone, methyl ethyl ketone, cyclohexanone, acetophenone, methyl isobutyl ketone, isophorone, diisobutylketone, methyl acetate, ethyl formate, ethyl acetate, diethyl carbonate, diethyl sulfate, butyl acetate, diacetone alcohol, diethyl glycol monobutyl ether, decanol, benzene acid, steak acid, tetrachloroethane, hexafluoroisopropanol, hexafluoroacetone sesquihydrate, acetonitrile, chlorodifluoromethane, trifluoroethane, difluoroethane and mixtures thereof.

In the present invention, in case of using a mixture of a supercritical fluid and an organic solvent as the reaction solvent, the total weight ratios of the homopolymer being initially introduced may be specifically from 1 to 50 parts by weight, based on 100 parts by weight of the entire solvent. When the ratio of the homopolymer being used is less than 1 part by weight, the efficiency of the mixed solvent system decreases, and the shape of the stereocomplex polymer produced in the form of powder or porous foam is difficult to maintain. Meanwhile, when the ratio of the homopolymer being used is greater than 50 parts by weight, problems may occur due to the high probability of decrease in the productivity of the polymer stereocomplex and formation of non-uniform fine powder or porous foam.

In addition, the weight ratio of the organic solvent relative to the supercritical fluid may be specifically from 0.5 to 100, based on 100 parts by weight of the supercritical fluid. If the ratio of organic solvent is less than 0.5 parts by weight, the solubility-increasing effect caused by the organic solvent in a supercritical fluid-mixed system is insignificant, resulting in a very low stereocomplex productivity, which is almost similar to a case where no organic solvent is used. Further, if the ratio of organic solvent is 100 parts by weight or more, the advantage of environmentally-friendly supercritical fluid is offset by the toxicity of the residual organic solvent.

The reactor according to the present invention may be a high pressure reactor sealed with a high pressure of around 350 bar, and may be equipped with proportional-integral-derivative temperature controllers, thermometers, heaters, pressure gauges, safety valves, stirrers capable of stirring reactants, and corresponding speed regulators and rotary speedometers for measuring the speed.

The process for introducing the supercritical fluid may be carried out in a batchwise or continuous operation, while the compressed gas being introduced can thoroughly dissolve homopolymers being introduced and polymer stereocomplexes being produced, resulting in a uniform reaction.

Biodegradable polymers which can be used for the present invention may be polymers polymerized from cyclic ester monomers, particularly biodegradable polyesters such as aliphatic polyesters and copolymerizable polyesters. As the monomers of the polymers, at least one selected from the group consisting of lactides, lactones, cyclic carbonates, cyclic anhydrides and thiolactones may be used, as long as they contain a chiral carbon.

Among the above cyclic ester monomers, more specifically at least one selected from the compounds represented by Formula I below may be used, while most specifically lactides from the compounds of Formula I may be used.

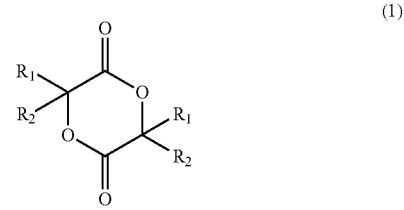

(1)

(where $R_1$ and $R_2$ are each independently hydrogen or $C_1$-$C_4$ alkyl)

In the present invention, the productivity of the polymer stereocomplex may be controlled according to the type of the supercritical reaction fluid, the type of the organic solvent being mixed, the total concentration of the solvent, the weight ratio of the supercritical fluid and organic solvent, reaction temperature, reaction pressure, reaction time, etc.

After the mixing reaction is completed, the products in the reactor may be sprayed into the air to collect the polymer stereocomplex powders. Also, if the pressure within the reactor is reduced while controlling the speeds of spraying the supercritical fluid and solvent after the reaction is terminated, stereocomplex polymers in the form of foam with different porosity and pore size may be obtained.

If biodegradable polymer stereocomplexes are prepared according to the method of the present invention, there is no need to separately remove the organic solvent since there is no residual organic solvent present in the stereocomplex, and the solvent used in the reaction can be recovered and reused which is environmentally friendly. In addition, because stereocomplex powder or foams of high molecular weight biodegradable polyester may be formed without the addition of any separate stabilizer, polymer stereocomplexes having thermal stability and high strength can be prepared by a simple, low-cost, single continuous process. Further, the polymer stereocomplexes obtained according to the present invention contain little residual organic solvent and have favorable physical properties, and thus, may be advantageously used not only in conventional and medical materials, but also in engineering plastics, conventional replacement materials of plastics, high performance medical materials, etc., that require high strength and thermal stability.

The present invention is further described and illustrated in the Example provided below. However, it should be noted that the following Example is presented only for illustrative purposes and is not intended to limit the scope of the present invention.

Example 1

Figure 2:
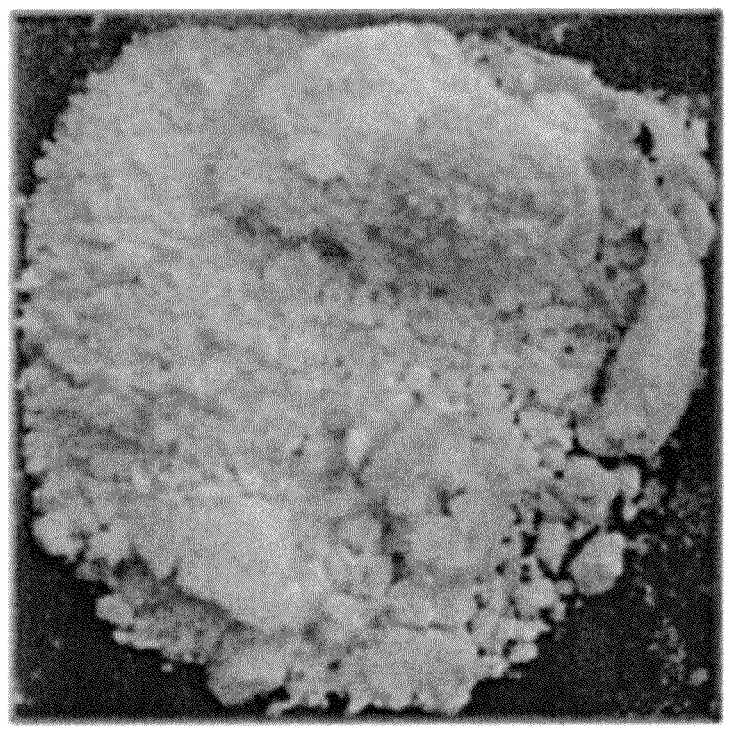
FIG. 2 is a photograph showing the polylactide stereocomplexes prepared in accordance with Example 1.

Poly L-lactide (0.84 g, weight average molecular weight 150,000) and poly D-lactide (weight average molecular weight 130,000) were added into a 40-mL high pressure reactor in a 1:1 weight ratio. The weight ratio of the total polymer to the total solvent (supercritical carbon dioxide (weight ratio 70) and dichloromethane (weight ratio 30)) was set at 5:100. The schematic diagram of the polymer stereocomplex system used is shown in FIG. 1. The high pressure reactor containing the two types of polymers was purged with nitrogen for 5 minutes and subjected to vacuum at 40° C. for 1 hour. Subsequently, the organic solvent was added thereto by a syringe, and carbon dioxide was introduced into the above high pressure reactor by pressurizing it using a high pressure liquid pump. Thereafter, the temperature and pressure were gradually increased such that the temperature and the pressure inside the reactor were 85° C. and 250 bar, respectively. When the temperature and the pressure became constant, the reaction was carried out by stirring for 5 hours. Once the reaction was completed, the reactor was opened to terminate the reaction and obtain a polylactide stereocomplex in the form of powder. The obtained polylactide stereocomplex in the form of powder is shown in FIG. 2. In order to demonstrate the excellence of the method of the present invention, a polylactide stereocomplex was prepared by conventional solvent casting as the control (hereinafter referred to as "Sc by solvent casting") and compared with the stereocomplex prepared by using sc-$CO_2$-dichloromethane according to the present invention (hereinafter referred to as "Sc by sc-$CO_2$-dichloromethane") in terms of physical properties.

Figure 3:
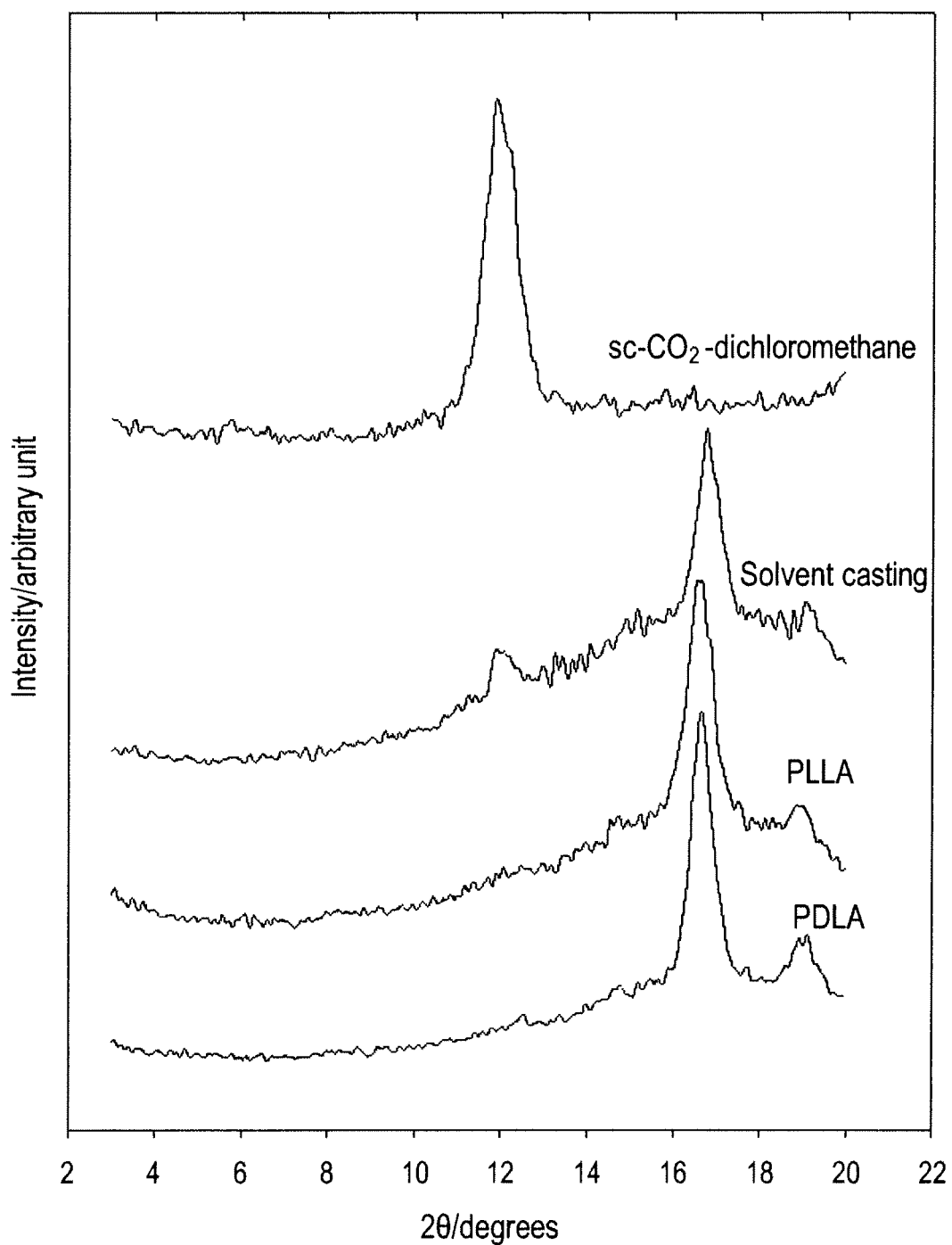
FIG. 3 is an X-ray diffraction pattern of the polylactide stereocomplexes prepared in accordance with Example 1.
Figure 4:
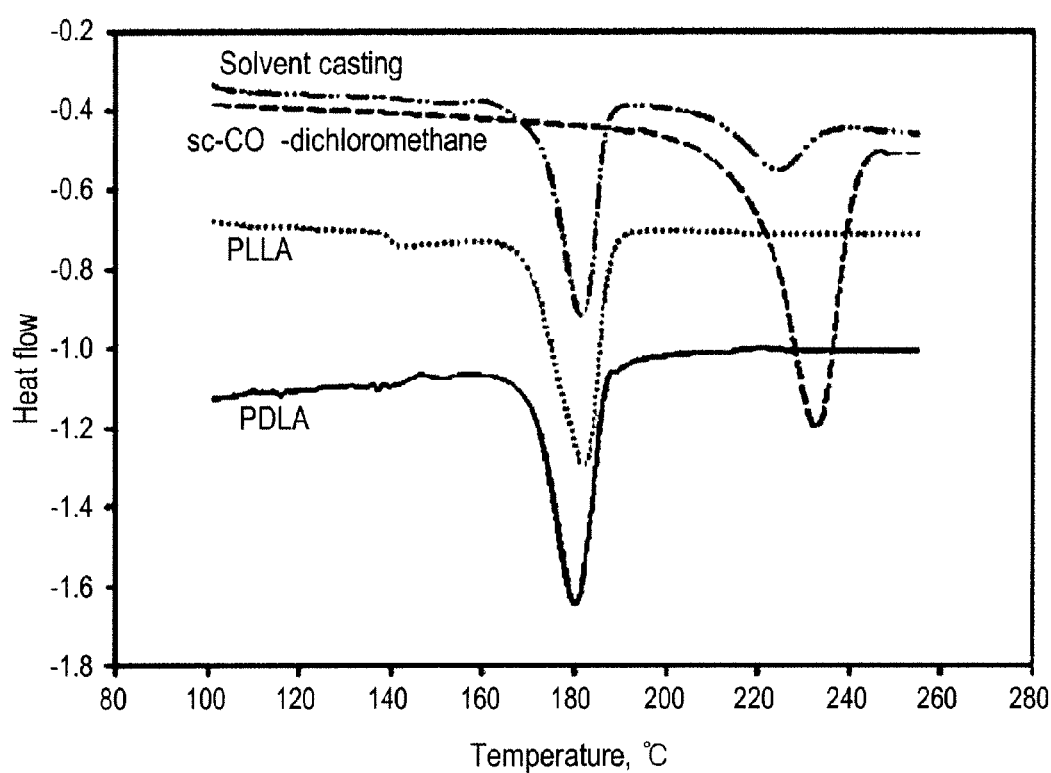
FIG. 4 shows the results from a differential scanning calorimetry analysis illustrating the thermal stability of the polylactide stereocomplexes prepared in accordance with Example 1.

X-ray diffraction analysis was carried out to determine whether or not the polylactide stereocomplex was formed. Since poly D-lactide (PDLA) and poly L-lactide (PLLA) have a right-handed helical structure and a left-handed helical structure, respectively, uniform mixtures of the two polymers have a structure where the PDLA and PLLA chains are packed side by side in a parallel fashion to form a lamellar structure. As a result, the helical structures and the crystalline structures of the homopolymers (PDLA and PLLA) show different X-ray diffraction patterns, as compared to those of the stereocomplex (Sc) composed of the homopolymers, as shown in FIG. 3. Also, in order to measure the thermal stability of the stereocomplex, differential scanning calorimetry analysis was performed, which indicated that the polylactide stereocomplex had a melting temperature ($T_m$) of 230° C., which was higher than that of PDLA or PLLA by 50° C. or more (FIG. 4). Further, in order to measure the changes in mechanical and physical properties, the tensile strengths of PDDA, PLLA, the Sc by solvent casting, and the Sc by sc-$CO_2$-dichloromethane were measured, which indicated that the physical properties of the polylactide stereocomplex prepared according to the present invention were the most superior. The results are shown in Table 1 below.

TABLE 1

| Materials | Elongation at break (%) | Tensile Strength (MPa) | Young's modulus (GPa) |
| --- | --- | --- | --- |
| PDLA | 2.14 | 14.3 | 1.60 |
| PLLA | 2.36 | 10.9 | 1.59 |
| Sc by solvent casting | 3.67 | 36.4 | 1.64 |
| Sc by sc-$CO_2$-dichloromethane | 4.31 | 47.8 | 2.02 |

According to the methods of the present invention where two types of biodegradable homopolymers are formed into stereocomplex polymers by using a mixture of supercritical fluid that is a compressed gas and an organic solvent as a reaction solvent, high molecular weight biodegradable polymer stereocomplexes can be prepared by a low-cost, remarkably simple, and environment friendly process using a small amount of organic solvent. Also, the polymer stereocomplexes obtained according to the present invention contain little residual organic solvent and have favorable physical properties, and thus, may be advantageously used, without any separate removal process, not only in conventional and medical materials, but also in engineering plastics, conventional replacement materials of plastics, high performance medical materials, etc., that require high strength and thermal stability.

While the present invention has been described and illustrated with respect to a number of embodiments of the invention, it will be apparent to those skilled in the art that variations and modifications are possible without deviating from the broad principles and teachings of the present invention, which is defined by the claims appended hereto.

What is claimed:

1. A method for preparing a biodegradable polymer stereocomplex comprising:
    introducing together two lactide homopolymers that comprise a D-form lactide homopolymer and an L-form lactide homopolymer into a reactor;
    adding an organic solvent and subsequently a supercritical fluid to the reactor wherein the organic solvent is between 25 to 50 percent of the total weight of the organic solvent and the supercritical fluid, wherein the organic solvent is selected from the group consisting of xylene, ethylbenzene, chlorobenzene, dichlorobenzene, methyl ethyl ketone, cyclohexanone, acetophenone, methyl isobutyl ketone, isophorone, diisobutyl ketone, diethyl carbonate, diethyl sulfate, diacetone alcohol, decanol, stearic acid, and mixtures thereof; and
    subjecting the two lactide homopolymers to conditions effective to obtain a polymer stereocomplex in a mixture of the organic solvent and the supercritical fluid.

2. The method of claim 1, further comprising spraying the mixture to collect the polymer sterocomplex wherein the obtained polymer stereocomplex is in a form of powder or porous foam.

3. The method of claim 2, further comprising recovering a portion of the mixture.

4. The method of claim 3, further comprising reusing the recovered portion of the mixture.

5. The method of claim 1, wherein the D-form lactide homopolymer and the L-form lactide homopolymer comprise monomers represented by Formula I below:

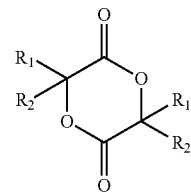

wherein $R_1$ and $R_2$ are each independently hydrogen or $C_1$-$C_4$ alkyl such that $R_1$ and $R_2$ are different from each other so that the lactide monomers have chiral carbon atoms.

6. The method of claim 1, wherein the supercritical fluid is a compressed gas selected from the group consisting of carbon dioxide ($CO_2$), dichlorotrifluoroethane (HFC-23), difluoromethane (HFC-32), difluoroethane (HFC-152a), trifluoroethane (HFC-143a), tetrafluoroethane (HFC-134a), pentafluoroethane (HFC-125), heptafluoropropane (HFC-227ea), hexafluoropropane (HFC-236fa), pentafluoropropane (HFC-245fa), sulfur hexafluoride ($SF_6$), perfluorocyclobutane (C-318), dichlorofluoroethane (HCFC-1416), chlorodifluoroethane (HCFC-1426), chlorofluoromethane (HCFC-22), dimethyl ether, propane, butane and mixtures thereof.

7. The method of claim 1, wherein the organic solvent is selected from the group consisting of xylene, ethylbenzene, chlorobenzene, dichlorobenzene, cyclohexanone, acetophenone, isophorone, diisobutyl ketone, diethyl carbonate, diethyl sulfate, diacetone alcohol, decanol, stearic acid, and mixtures thereof.

8. The method of claim 1, wherein the organic solvent is selected from the group consisting of xylene, ethylbenzene, acetophenone, isophorone, and mixtures thereof.

9. The method of claim 1, wherein the organic solvent comprises diethyl sulfate.

10. The method of claim 1, wherein said subjecting the two lactide homopolymers to conditions effective to obtain the polymer stereocomplex comprises carrying out a reaction at a temperature ranging from 25° C. to 250° C. and a pressure ranging from 40 to 700 bar.

11. The method of claim 10, wherein said subjecting the two lactide homopolymers to conditions effective to obtain the polymer stereocomplex comprises carrying out a reaction at a temperature ranging from 25° C. to 150° C. and a pressure ranging from 100 to 400 bar.

12. The method of claim 10, wherein said subjecting the two lactide homopolymers to conditions effective to obtain the polymer stereocomplex comprises carrying out a polymerization reaction for 5 minutes to 10 hours such that the stereoisomer polymer yield is in the range of from 1 to 100%.

13. A method for preparing a biodegradable polymer stereocomplex comprising:
   introducing D- and L-form homopolymers together into a reactor wherein monomers of the D- and L-form homopolymers are selected from the group consisting of lactones, cyclic carbonates, cyclic anhydrides and thiolactones;
   adding an organic solvent and a supercritical fluid to the reactor,
      wherein the organic solvent is between 25 to 50 percent of the total weight of the organic solvent and the supercritical fluid,
      wherein the organic solvent is selected from the group consisting of xylene, ethylbenzene, chlorobenzene, dichlorobenzene, methyl ethyl ketone, cyclohexanone, acetophenone, methyl isobutyl ketone, isophorone, diisobutyl ketone, diethyl carbonate, diethyl sulfate, diacetone alcohol, decanol, stearic acid, and mixtures thereof; and
   subjecting the D- and L-form homopolymers to conditions effective to obtain a polymer stereocomplex in a mixture of the organic solvent and the supercritical fluid.

14. The method of claim 13, further comprising spraying the mixture to collect the polymer stereocomplex, wherein the obtained polymer stereocomplex is in a form of powder or porous foam.

15. The method of claim 14, further comprising recovering a portion of the mixture.

16. The method of claim 15, further comprising reusing the recovered portion of the mixture.

17. The method of claim 13, wherein the organic solvent comprises diethyl sulfate.

18. The method of claim 13, wherein the organic solvent comprises acetophenone.

19. The method of claim 13, wherein the organic solvent comprises isophorone.

* * * * *